(12) United States Patent
Ward

(10) Patent No.: US 8,769,838 B2
(45) Date of Patent: Jul. 8, 2014

(54) SURVEYOR'S ROD AND MAGNETIC LOCATOR

(75) Inventor: Warren Dale Ward, Fraser, CO (US)

(73) Assignee: Warren Dale Ward, Fraser, CO (US)

( * ) Notice: Subject to any disclaimer, the term of this patent is extended or adjusted under 35 U.S.C. 154(b) by 393 days.

(21) Appl. No.: 12/924,275

(22) Filed: Jan. 10, 2011

(65) Prior Publication Data
US 2012/0186090 A1  Jul. 26, 2012

(51) Int. Cl.
*G01C 15/06* (2006.01)
(52) U.S. Cl.
USPC ............................................. 33/293
(58) Field of Classification Search
USPC ..................................... 33/290–296
See application file for complete search history.

(56) References Cited

U.S. PATENT DOCUMENTS

| | | | | |
|---|---|---|---|---|
| 4,803,784 A * | 2/1989 | Miller | | 33/293 |
| 5,457,890 A * | 10/1995 | Mooty | | 33/294 |
| 6,023,326 A * | 2/2000 | Katayama et al. | | 33/290 |
| 6,076,267 A * | 6/2000 | Gotoh | | 33/293 |
| 6,502,321 B1 * | 1/2003 | Crain et al. | | 33/296 |
| 6,834,839 B1 * | 12/2004 | Wilson | | 33/296 |
| 7,611,105 B1 * | 11/2009 | Carazo | | 33/293 |
| 7,788,815 B2 * | 9/2010 | Yandrick et al. | | 33/294 |
| 8,201,340 B2 * | 6/2012 | Steffensen | | 33/296 |
| 8,230,609 B1 * | 7/2012 | Sanders et al. | | 33/293 |
| 2008/0229592 A1 * | 9/2008 | Hinderling et al. | | 33/293 |
| 2008/0256812 A1 * | 10/2008 | Yandrick et al. | | 33/294 |
| 2012/0124850 A1 * | 5/2012 | Ortleb et al. | | 33/228 |

* cited by examiner

*Primary Examiner* — G. Bradley Bennett

(57) ABSTRACT

This invention is a universal and configurable land surveying and mapping tool. This invention combines several functions into one tool and is unique because of its one tool that provides the ability to perform a plurality of surveying task including metal detection and determining location data (i.e. GPS data).

7 Claims, 3 Drawing Sheets

SURVEYOR'S ROD AND MAGNETIC LOCATOR

CLAIM TO PRIORITY

None

FIELD OF THE INVENTION

The present invention is a universal configuration tool that combines and consolidates at least eight separate tools used in surveying.

BACKGROUND OF THE INVENTION

Surveying is the technique, profession, and science of accurately determining the terrestrial or three-dimensional position of points and the distances and angles between them. These points are usually on the surface of the Earth and such information is often used for purposes such as establishing boundaries of land ownership.

To accomplish their objective, surveyors use elements of well know principles of mathematics (especially trigonometry and geometry) and a plurality of tools. More specifically, land surveyors often use two common tools when measuring property corners: A magnetic locator to search for property corner monuments buried beneath the surface of the ground, and, a separate rod, that when held plumb, allows electronic and/or Global Positioning System (GPS) measurements to take place.

There are prior art magnetic locators and surveyor's rods on the market that work well for their limited purposes. However, there are no known prior art tools that provide both functions with one tool.

What is needed is a tool that combines the features of providing magnetic location and measurements to allow a surveyor to work much more efficiently than the current practice of purchasing two or three tools and hiring one extra crew member to carry one of the tools during the normal procedure of a field property survey, requiring numerous searches, finding of property corner monuments, then making the measurement either with a remote electronic measuring device making observations to a rod with a prism attached to the top or making GPS measurements with a rod with GPS antennae attached.

Disclosed herein is an apparatus called a "MAGROD" that allows a surveyor to purchase just one tool that performs a metal detector function, a prism rod function and a GPS function. At any time, the surveyor may use the "MAGROD" only as a magnetic locator, or only as a prism rod, or only as a GPS rod.

Conversely, Land surveyors commonly walk along property lines they are locating, carrying their equipment from point to point.

SUMMARY OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide an improved surveying apparatus configured to locate buried metal objects magnetically and make measurements with one tool, instead of two or three tools.

Yet another principle object of the present invention is to provide an improved surveying apparatus configured for use as any one of a plurality of functions such as a magnetic locator, or only as a prism rod, or only as a GPS rod.

Additional objects and advantages of the present invention are set forth in the detailed description herein or will be apparent to those skilled in the art upon reviewing the detailed description.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
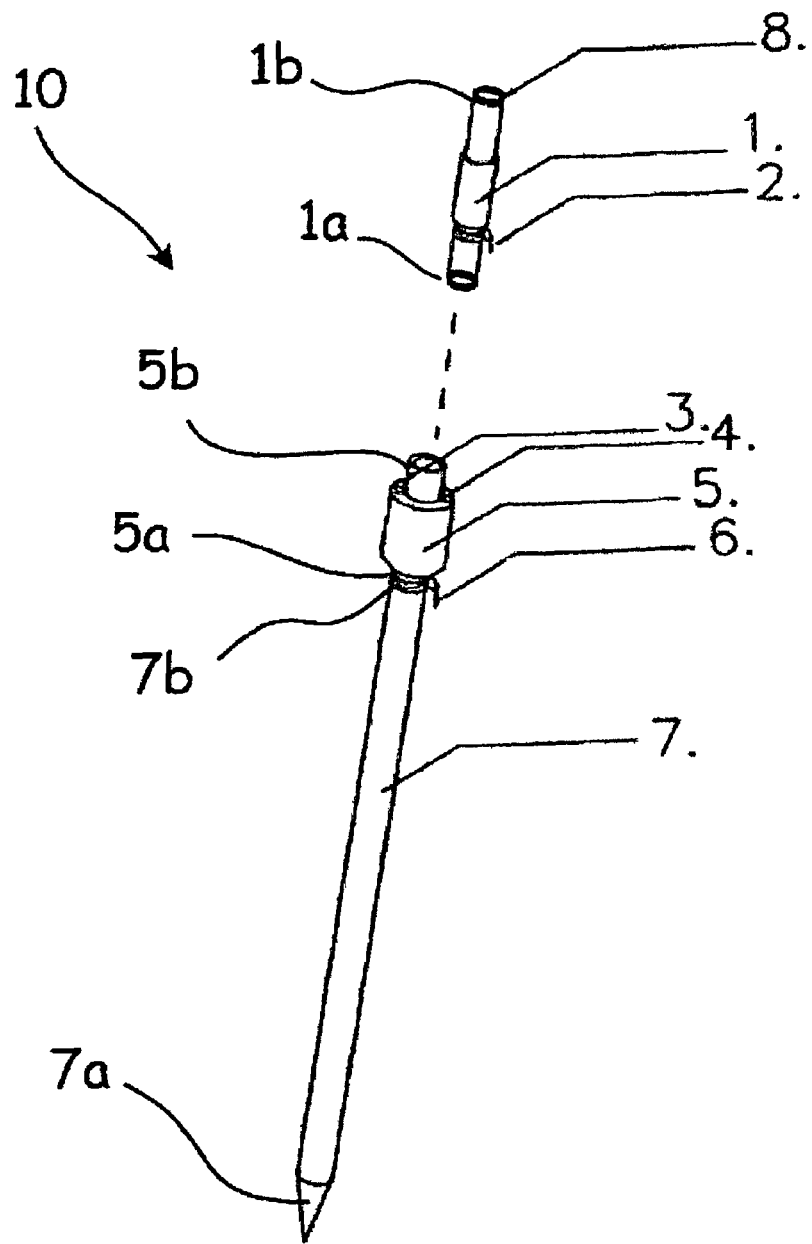
FIG. 1 is a side perspective view, partially exploded, of the apparatus depicting a magrod mechanically associated with a electronic controller.

Repeat use of reference characters throughout the present specification and appended drawings is intended to represent the same or analogous features or elements of the present technology. Various objects, advantages, and features of the invention will become apparent to those skilled in the art from the following discussion taken in conjunction with the drawings.

DESCRIPTION OF THE PREFERRED EMBODIMENTS

Reference now will be made in detail to the embodiments of the invention, one or more examples of which are set forth below.

Referring now to FIG. 1, a configurable apparatus, hereafter "MAGROD", for providing a plurality of surveying functions is depicted. MAGROD (10) comprises a rod portion (7) that is at least partially hollow defining a first end (7a) and a an opposing second end (7b). For one embodiment the rod portion (7) defines a telescopic rod. The first end (7a) defines a pointed magnetic interface and said opposing second end (7b) defines a rod-to-accessory interface configure for receiving any one of a plurality of rod accessories including (a) a magnetic sensor controller (5), (b) a GPS device (1), and (c) a prism device. As depicted in FIG. 1, for the currently preferred embodiment the rod-to-accessory interface comprises threads. A magnetic sensor disposed within said rod portion (7). Such magnetic sensor is suitably configured for detecting a metallic object and generating sensor signals that are received by a magnetic sensor controller (5).

Magnetic sensor controller (5) defines an electronics housing disposed between a controller first end (5a) and a controller second end (5b) wherein said controller first end defines a controller-interface and said controller second end defines a controller-to-accessory interface. The controller-interface may further comprise a locking clamp (6). The controller-interface is configured for being mechanically associated with said rod-to-accessory interface and electrically associated with said magnetic sensor. Such magnetic sensor controller is configured for controlling (4) said magnetic sensor and generating volume controlled sound (3) when said magnetic sensor generates signals that indicate a metal object has been detected.

The MAGROD (10) device is further configured to comprise at least one a rod accessory. One such rod accessory is a GPS device (1) (GPS—Global Positioning System) defining a first GPS end (1a) and an opposing second GPS end (1b) wherein said first GPS end (1a) defines a GPS-interface and said second GPS end (1b) defines a GPS-to-accessory interface. For example, the system is configured so that either a GPS antenna may be mechanically associated with said GPS-to-accessory interface or a prism device as desired. Further, the GPS-interface may further comprise a locking clamp (2). The GPS device (1) is configured to generate location data.

Another rod accessory is a prior art prism configured with a prism interface configured for being mechanically associated with one of (i) said rod-to-accessory interface, (ii) said controller-to-accessory interface, and (iii) said GPS-to-accessory interface.

Figure 2:
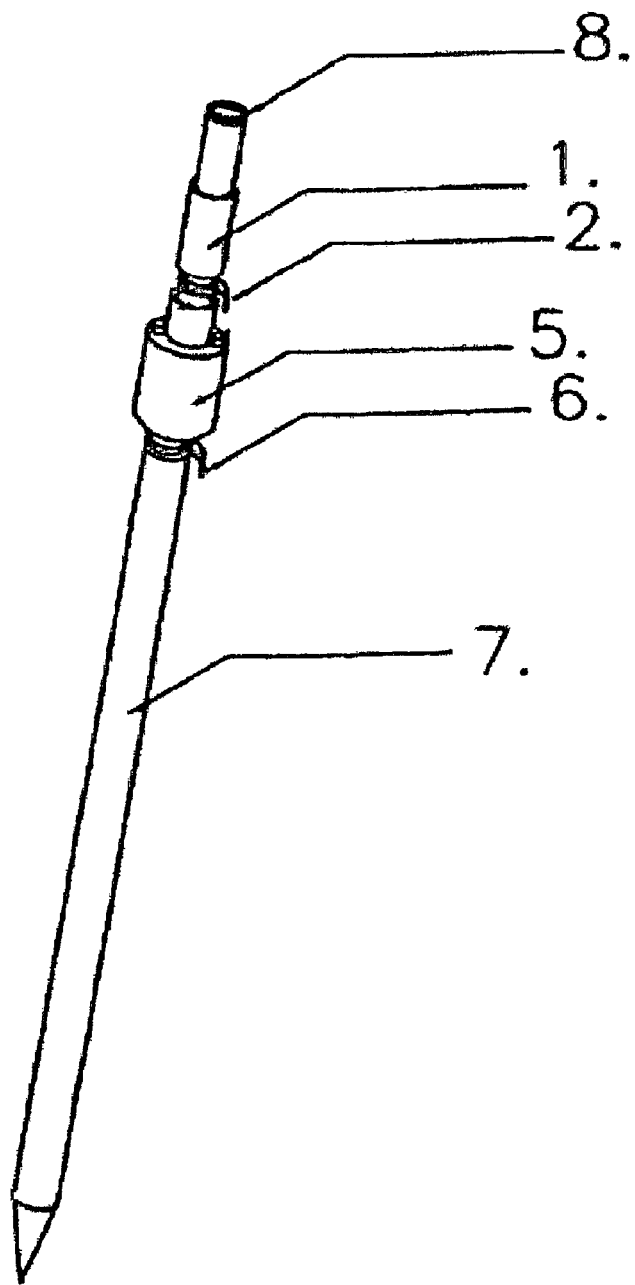
FIG. 2 is a side perspective view of the apparatus depicted in FIG. 1 further comprising an rod attachment.
Figure 3:
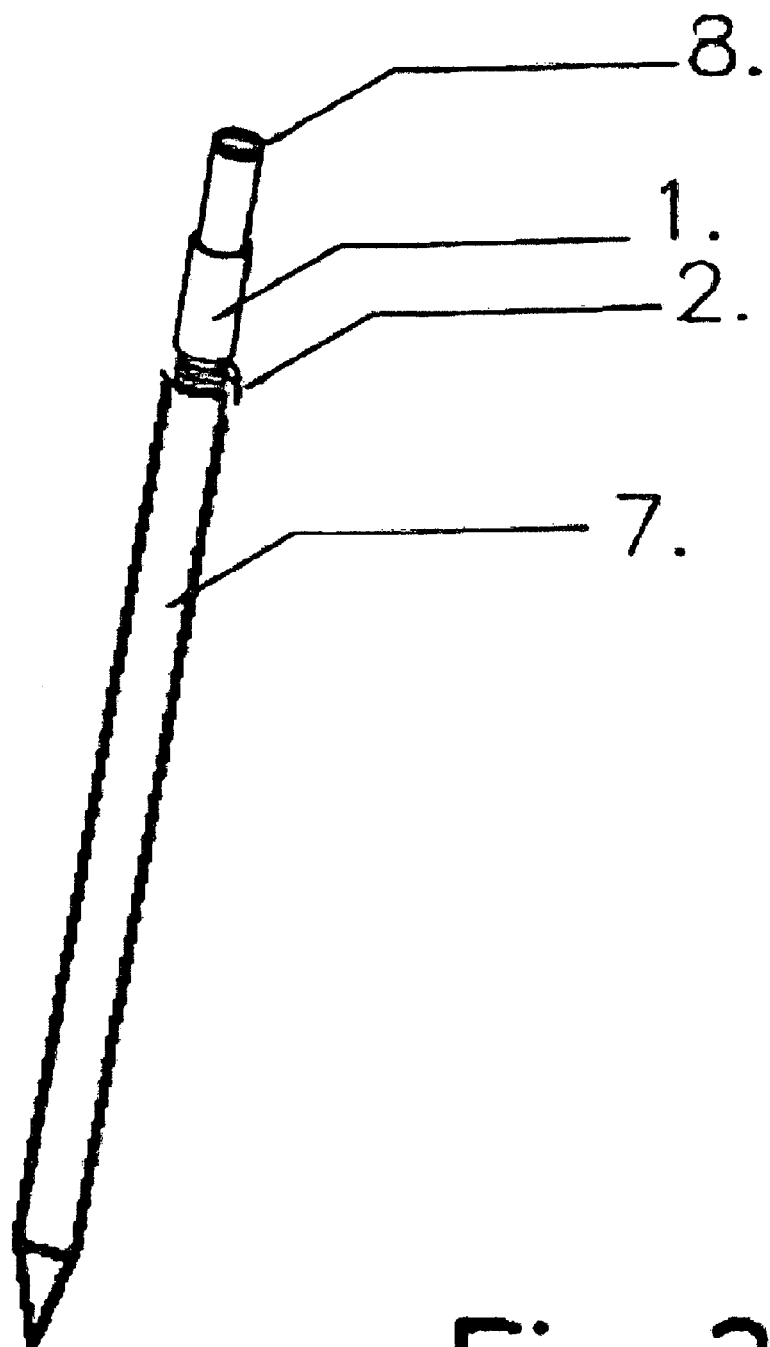
FIG. 3 is a side perspective view of the apparatus depicting a rod attachment mechanically associated with a rod attachment.

Referring not to FIGS. 2 and 3, FIG. 2 depicts a MAGROD (10) device assembled and comprising a rod portion (7), magnetic sensor controller (5) and a GPS device (1) whereas FIG. 3 depicts the MAGROD (10) device comprising only a rod portion (7) and a GPS device (1). One of ordinary skill in the art will appreciate that the MAGROD (10) apparatus is configurable to provide a plurality of surveying functions by being configured as a magnetic locator, a prism rod and a GPS rod all in one tool.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

The invention claimed is:

1. A configurable apparatus for providing a plurality of surveying functions, said configurable apparatus comprising:
    a rod portion that is at least partially hollow defining a first end and a an opposing second end wherein said first end defines a pointed magnetic interface and said opposing second end defines a rod-to-accessory interface configure for receiving any one of a plurality of rod accessories including (a) a magnetic sensor controller, (b) a GPS device, and (c) a prism device;
    a magnetic sensor disposed within said rod portion wherein said magnetic sensor is suitably configure for detecting a metallic object;
    a magnetic sensor controller defining an electronics housing disposed between a controller first end and a controller second end wherein said controller first end defines a controller-interface and said controller second end defines a controller-to-accessory interface and wherein said controller-interface is configured for being mechanically associated with said rod-to-accessory interface and wherein said magnetic sensor controller is configured for controlling said magnetic sensor; and
    at least one a rod accessory selected from one of (a) a GPS device defining a first GPS end and an opposing second GPS end wherein said first GPS end defines a GPS-interface and said second GPS end defines a GPS-to-accessory interface wherein said GPS device is configured to generate location data; and (b) prism device defining a prism-interface configured for being mechanically associated with one of (i) said rod-to-accessory interface, (ii) said controller-to-accessory interface, and (iii) said GPS-to-accessory interface.

2. A configurable apparatus for providing a plurality of surveying functions as in claim 1, wherein said rod portion defines a telescopic rod.

3. A configurable apparatus for providing a plurality of surveying functions as in claim 1, comprising both a GPS device and a prism device and wherein said GPS-interface is mechanically associated with said controller-to-accessory interface and wherein said prism-interface is mechanically GPS-to-accessory interface.

4. A configurable apparatus for providing a plurality of surveying functions as in claim 1, wherein said magnetic sensor controller generates sound indicating a metallic object has been detected and wherein said magnetic sensor controller further comprises a volume control feature.

5. A configurable surveying apparatus, said configurable apparatus comprising:
    a rod portion that is at least partially hollow defining a first end and a an opposing second end wherein said first end defines a pointed magnetic interface and said opposing second end defines a rod-to-accessory interface configure for receiving any one of a plurality of rod accessories including (a) a magnetic sensor controller, (b) a GPS device, and (c) a prism device;
    a magnetic sensor disposed within said rod portion wherein said magnetic sensor is suitably configure for detecting a metallic object;
    a magnetic sensor controller defining an electronics housing disposed between a controller first end and a controller second end wherein said controller first end defines a controller-interface and said controller second end defines a controller-to-accessory interface and wherein said controller-interface is configured for being mechanically associated with said rod-to-accessory interface and wherein said magnetic sensor controller is configured for controlling said magnetic sensor;
    a GPS device defining a first GPS end and an opposing second GPS end wherein said first GPS end defines a GPS-interface and said second GPS end defines a GPS-to-accessory interface wherein said GPS device is configured to generate location data and wherein said GPS-interface is releaseably associated with said controller-to-accessory;
    a prism device defining a prism-interface configured for being releaseably associated with one of (i) said rod-to-accessory interface, (ii) said controller-to-accessory interface, and (iii) said GPS-to-accessory interface; and
    wherein said rod portion defines a telescopic rod.

6. A configurable surveying apparatus as in claim 5, comprising both a GPS device and a prism device and wherein said GPS-interface is mechanically associated with said controller-to-accessory interface and wherein said prism-interface is mechanically GPS-to-accessory interface.

7. A configurable surveying apparatus as in claim 6, wherein said magnetic sensor controller generates sound indicating a metallic object has been detected and wherein said magnetic sensor controller further comprises a volume control feature.

* * * * *